US009729015B2

(12) United States Patent
Desai et al.

(10) Patent No.: US 9,729,015 B2
(45) Date of Patent: Aug. 8, 2017

(54) METHOD AND APPARATUS FOR A BODY-WORN ELECTRONIC DEVICE TO DYNAMICALLY SELECT A POWER SOURCE IN A WIRELESS SYSTEM

(71) Applicant: MOTOROLA SOLUTIONS, INC, Schaumburg, IL (US)

(72) Inventors: Dipti V. Desai, Lawrenceville, GA (US); John E. Herrmann, Suwanee, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 339 days.

(21) Appl. No.: 14/725,576

(22) Filed: May 29, 2015

(65) Prior Publication Data
US 2016/0352156 A1 Dec. 1, 2016

(51) Int. Cl.
*H02J 50/80* (2016.01)
*H02J 5/00* (2016.01)
*H02J 7/02* (2016.01)
*H02J 50/12* (2016.01)

(52) U.S. Cl.
CPC ............ *H02J 50/80* (2016.02); *H02J 5/005* (2013.01); *H02J 7/025* (2013.01); *H02J 50/12* (2016.02)

(58) Field of Classification Search
CPC ............ H02J 5/005; H02J 7/025; H02J 50/12

USPC ........................................ 307/104
See application file for complete search history.

(56) References Cited

U.S. PATENT DOCUMENTS

| 8,427,014 B2 | 4/2013 | Eckhoff et al. |
| 2007/0222426 A1 | 9/2007 | Waffenschmidt et al. |
| 2013/0007949 A1 | 1/2013 | Kurs et al. |
| 2014/0015470 A1 | 1/2014 | Lim et al. |

FOREIGN PATENT DOCUMENTS

WO 2013124849 A1 8/2013

OTHER PUBLICATIONS

Motorola Solutions, Inc.—U.S. Appl. No. 14/524,533, filed Oct. 27 2014, entitled Method and Apparatus for Optimally Locating a Device to Be Charged in a Charging Area of a Wireless Charger.

*Primary Examiner* — Robert Deberadinis
(74) *Attorney, Agent, or Firm* — Barbara R. Doutre

(57) ABSTRACT

Body-worn wireless electronic devices may be powered by one or more wireless power sources. These wireless power sources may comprise body-worn wireless power sources and non body-worn wireless power sources. The sources are detected by the electronic device and are either prioritized based on being body-worn or non body-worn. The selection of sources for powering the electronic device(s) may alternatively be made based on predetermined parameters associated with the power sources. Optimal power transfer is thus obtained for the electronic devices while being worn.

30 Claims, 6 Drawing Sheets

METHOD AND APPARATUS FOR A BODY-WORN ELECTRONIC DEVICE TO DYNAMICALLY SELECT A POWER SOURCE IN A WIRELESS SYSTEM

FIELD OF THE DISCLOSURE

The present disclosure relates generally to the wireless powering of body-worn devices, and more specifically to the dynamic selection and prioritization of the wireless powering of such devices by body-worn power sources and non-body-worn power sources.

BACKGROUND

The public safety arena utilizes a variety of body-worn electronic devices. Portable two way radios, along with accessories such as remote speaker microphones, headsets, and sensors are just a few of the body-worn electronic devices that are used in such areas as law enforcement, fire rescue, and other emergency services.

Contactless or wireless powering has become highly desirable as an alternative to wired powering to allow for freedom of movement and flexibility in wearing body-worn electronics. However, there are concerns over the efficiency of wireless powering, particularly when several electronic devices are being worn at the same time.

Accordingly, there is a need for a wireless powering system the efficiently manages the powering of body-worn electronic devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
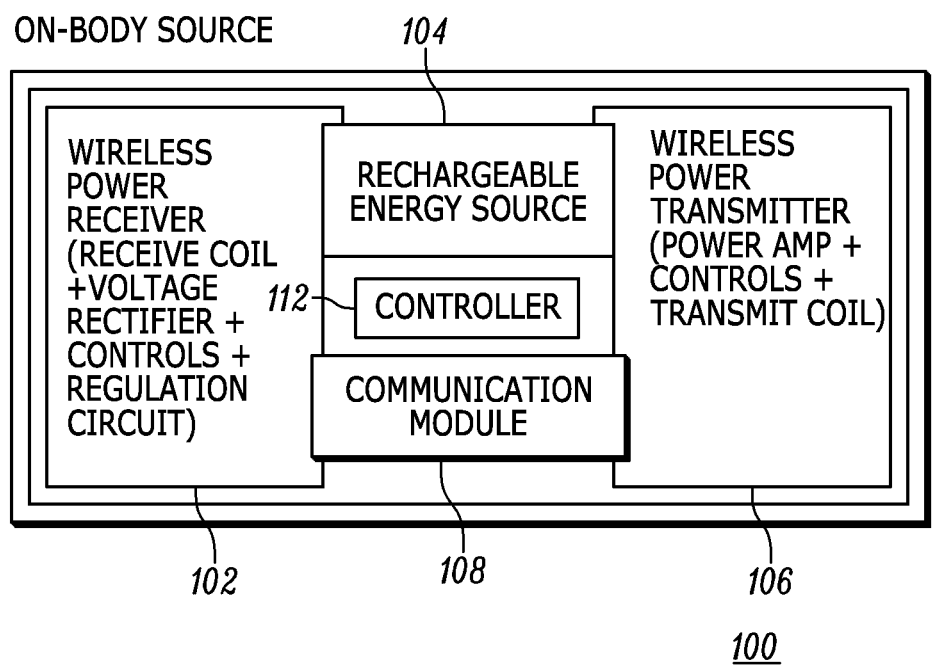
FIG. 1 is a diagram of a wireless power source in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Contactless or wireless powering is used as an alternative to wired powering to allow for freedom of movement and flexibility in wearing electronic devices such as remote speaker microphones (RSM), ear piece accessories, sensors and other body-worn electronics. For the purposes of this application a body-worn electronic device is an electronic device attached to an article of a user's clothing or worn on the user's body. For example a remote speaker microphone for coupling to epaulette would be one example of a body-worn electronic device. Another example of a body-worn electronic device would be an earpiece for coupling to a user's ear.

Wireless powering offers the convenience of simply placing the body-worn electronic device 'near' an on-body wireless power source, the term 'near' meaning that the body-worn electronic device is within the magnetic field of the on-body power source. There is no need to connect a cable or orient the body-worn electronic device to fit within the power source in any particular way. The on-body power source utilizes magnetic resonance and a power coil to provide power to the on-body electronic device. An example of the on-body power source is a relatively larger capacity battery, such as a standalone battery or a battery of a two-way radio that the user is carrying. When the user is on the move and away from the primary power source, this on-body battery acts as a source and powers/charges the user's wearable devices. However, as users continue to carry more and more devices, there is a desire to efficiently manage the powering/charging of a plurality of body-worn electronic devices.

FIG. 1 is a block diagram of a wireless power source 100 in accordance with some embodiments. The wireless power source 100 may be worn on or attached to an article of clothing and will also be referred to as a body-worn wireless power source 100. The body-worn wireless power source 100 may be a stand-alone device. The stand alone device can be moved about the article of clothing and attached via a variety of attachment mechanisms, such as hook/snap fasteners, clips, and pins to name a few. The body-worn wireless power source 100 may also be embodied as a power source from another communication device, such as two-way radio, a cell phone, a camera, or some other battery operated body-worn portable electronic device. Again, these devices may be clipped or otherwise attached to a user's clothing. In accordance with some of the embodiments, a plurality of body-worn wireless power sources 100 are dynamically selected for the efficient powering of a plurality of body-worn wireless electronic devices.

In accordance some embodiments, the body-worn wireless power source 100, whether as a standalone device or as part of an existing portable battery operated device, comprises a wireless power receiver 102, a rechargeable energy source 104, a wireless power transmitter 106, and a communication module 108 under control of a controller 112. The body-worn wireless power source 100 may further comprise a ferrite shield, if desired, to direct the magnetic field to maximize power transfer and minimize surface absorption rate of electromagnetic energy absorption. The wireless power receiver 102 comprises such elements as a receive coil and voltage rectifier and regulation circuit. The wireless power transmitter 106 comprises such elements as a power amplifier, controls and transmit coil.

Typically, the transmitter (our source) coil is designed to have a resonance at a frequency, and each device to be powered (shown in other figures) contains a receiving coil that is also resonant at the resonant frequency of the transmitter (or source) coil. This facilitates energy transfer through electromagnetic coupling between the source coil and the receiver coil. The device to be powered can be any portable electronic device which uses a rechargeable battery and is otherwise designed in accordance with the teachings herein. Dynamic selection of body-worn wireless power source(s) 100 for efficient power transfer to one or more body-worn wireless electronic devices will be described in conjunction with the remaining figures.

Figure 2:
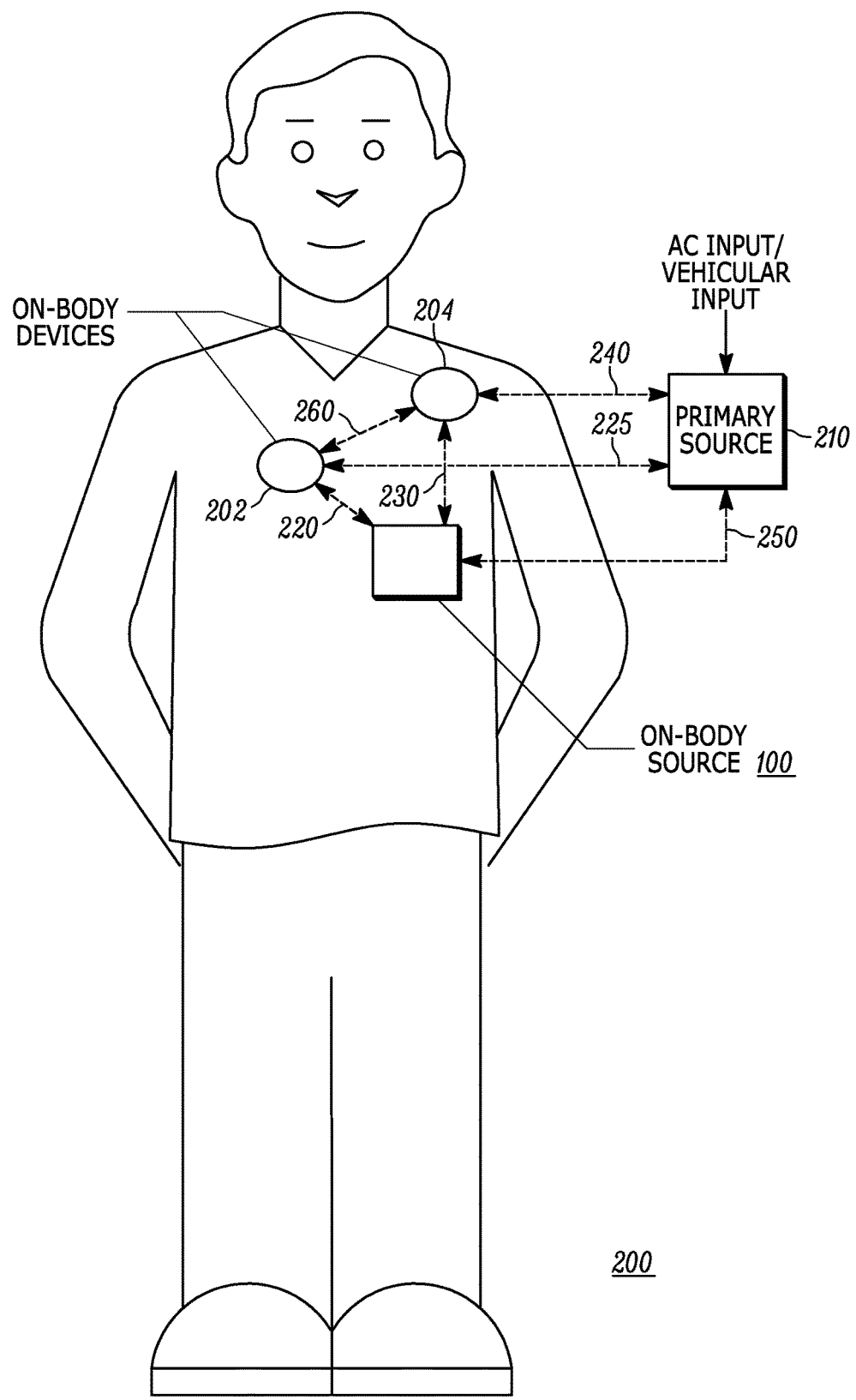
FIG. 2 is an example of a usage diagram of a wireless power system in accordance with some embodiments.

FIG. 2 is an example of a usage diagram of a wireless power system 200 in accordance with some embodiments. The wireless power system 200 comprises at least one body-worn wireless power source 100 and at least one non body-worn wireless power source 210 for powering at least one body-worn wireless electronic device, shows here as body-worn wireless electronic devices 202, 204. The body-worn wireless electronic devices 202, 204 (the devices to be powered or charged) may comprise, for example, a remote speaker microphone, sensors, video camera, wireless two-way radio remote PTT (push-to-talk) device, smart glasses or the like.

The on body-worn wireless power source(s) 100 may be formed as previously described in conjunction with FIG. 1 and may be a standalone device or operating as part of a portable battery operated electronic device.

In accordance with some embodiments the non body-worn wireless power source 210 may be powered from a vehicular power source or an AC power source. For embodiments powered from an AC power source (which may originate through a wall outlet, or be located for example through a table, or bench or some other location) the AC is converted to DC, for example by an AC-to-DC converter, which is then supplied to a power amplifier that drives a source coil. The non-body worn power source powered from AC is still considered a wireless power source in that its coil resonates at a specified frequency, generating a magnetic field. The non-body worn power source can basically provide an unlimited source of current, however, the AC power is typically more limited as to position and location. The non-body worn power source, when available, may be considered in some embodiments to be a primary power source due to its unlimited sourcing capability. For the purposes of this application, a non-body worn power source powered by AC power is considered to be a wireless power source in that transmit and receive coils under control of a communication module (similar to FIG. 1) generate wireless power signals.

The non body-worn wireless power source 210 embodied within a vehicle power source is more mobile (than the AC embodiment) and can also source significant amounts of current to power one or more body-worn wireless electronic devices 202, 204. The non body-worn wireless power source 210 embodied within the vehicle is considered to be a wireless power source in that transmit and receive coils under control of a communication module (similar to FIG. 1) generate wireless power signals.

In accordance with some embodiments, each body-worn wireless electronic device 202, 204 selects a wireless power source based on at least one of a plurality of predetermined parameters associated with the at least one body-worn wireless power source 100 and the at least one non body-worn wireless power source 210.

In accordance with some embodiments, the non body-worn wireless power source 210, with its almost unlimited power sourcing capability, may be prioritized as a primary source when located within a power transfer range of the device to be powered. The non body-worn wireless power source 210 would then power the body-worn wireless electronic devices 202, 204.

The body-worn wireless electronic device 202 is shown communicating via wireless communication link 220 with body-worn wireless power source 100 and communicating via wireless communication link 225 with the non body-worn wireless power source 210. Each link between any two devices is unique, and adjusts as devices change accordingly as well.

The body-worn wireless electronic device 204 is shown communicating via wireless communication link 230 with body-worn wireless power source 100 and communicating via wireless communication link 240 with the non body-worn wireless power source 210.

In accordance with some embodiments, wireless communications 250 may also take place between the body-worn wireless power source 100 and the non body-worn wireless power source 210. In accordance with some embodiments, wireless communications 260 may also take place between the two body-worn wireless electronic devices 202, 204.

The ability to communicate wirelessly amongst the plurality of devices within wireless power system 200 increases the flexibility to optimize the detection and dynamic selection of appropriate power sources. Examples of such communication links include but are not limited to, Bluetooth, Wi-Fi, and Nearfield, Zigbee to name a few.

The body-worn wireless power source 100 may be removably coupled to an article of clothing. This allows for varying the position of the power source relative to the body-worn devices 202, 204 to maximize power transfer efficiency as will be described later.

Figure 3:
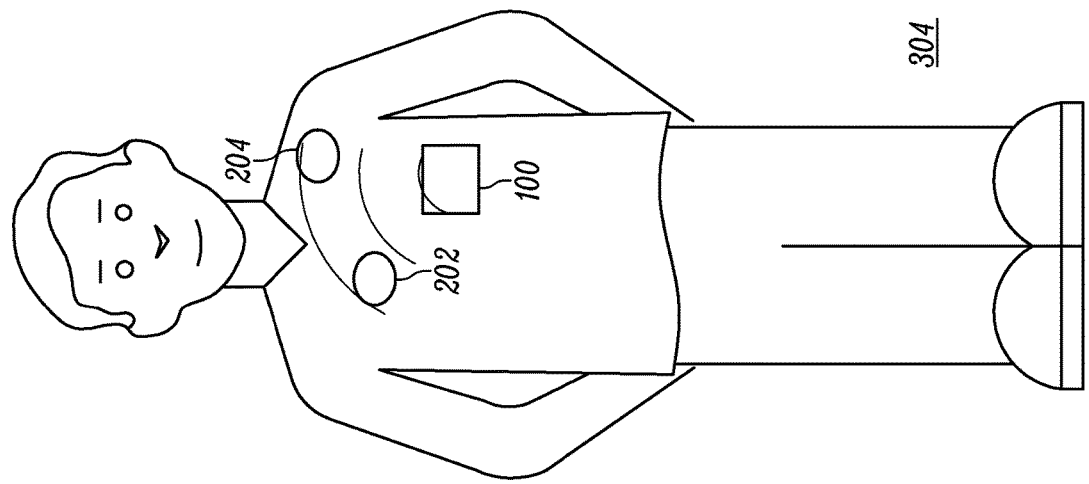
FIG. 3 shows further examples of usage diagrams for the power sources in accordance with some embodiments.
Figure 3:
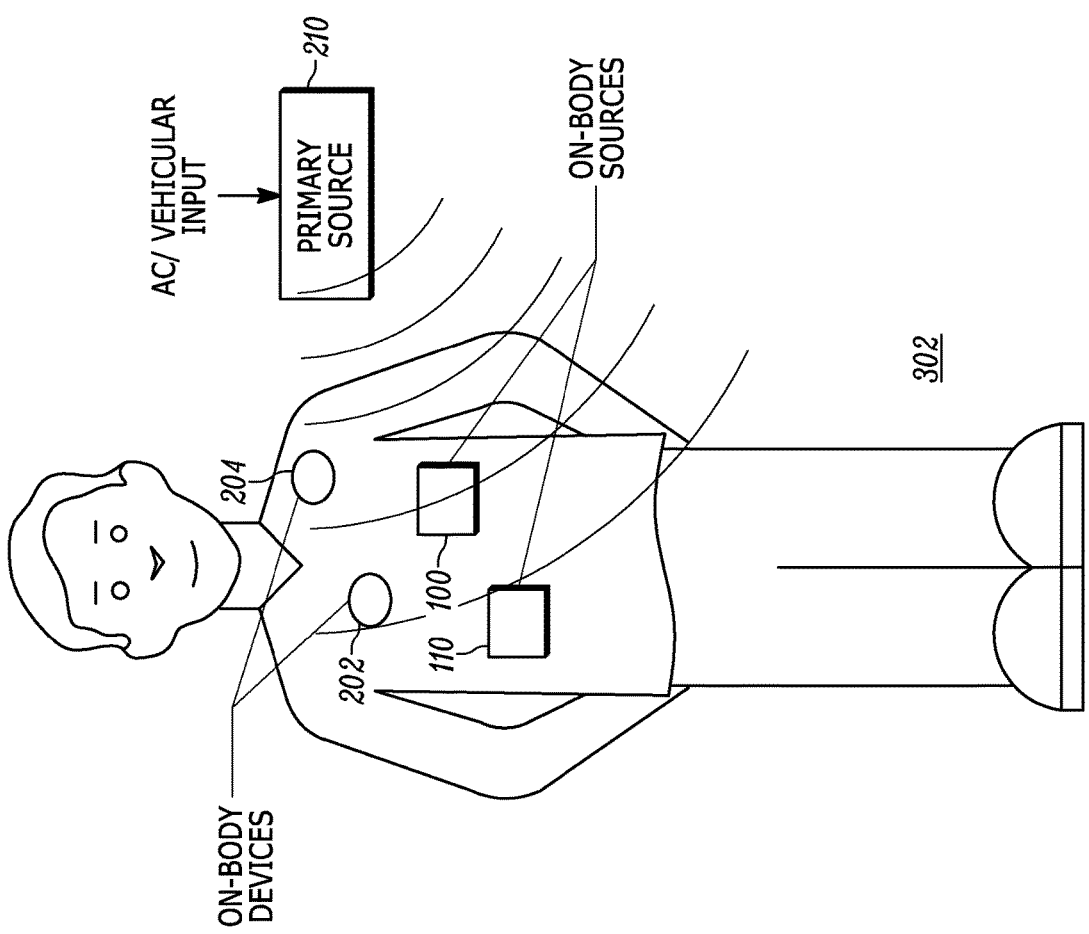

FIG. 3 shows further examples of usage diagrams for the power sources operating in wireless power systems 302, 304 in accordance with some embodiments. Wireless power system 302 comprises a non body-worn wireless power source 210, a plurality of body-worn wireless electronic devices 202, 204 and a plurality of body-worn wireless power sources 100, 110. In wireless power system 302, the non body-worn wireless power source 210 is prioritized for powering the body-worn wireless electronic devices 202, 204. Furthermore, the plurality of body-worn wireless power sources 100, 110 may also be charged by the non body-worn wireless power source 210. This allows the primary source, with when available, to take over and keep devices charged with its higher sourcing capabilities. Thus, if a user, gets into a vehicle, or enters a room, having non body-worn wireless power source 210 that source will take over as a priority source.

Wireless power system 304 comprises the body-worn wireless power source 100 and a plurality of body-worn wireless electronic devices 202, 204. In this embodiment, the wireless power system switches over to a complete on-body mode in which the body-worn wireless power source 100 takes over. In this embodiment, only one body-worn wireless power source 100 is shown. With only one source, the powering is done by that single source. As more sources are added, the selection of optimum power sources available for each electronic device can be determined based on predetermined parameters. Also, some embodiments may comprise both a plurality of body-worn wireless power sources and a plurality of non body-worn wireless power sources. The determination of which power source to select may be based on predetermined parameters, calculations, and/or comparisons to determine optimum matching of source to device.

Figure 4:
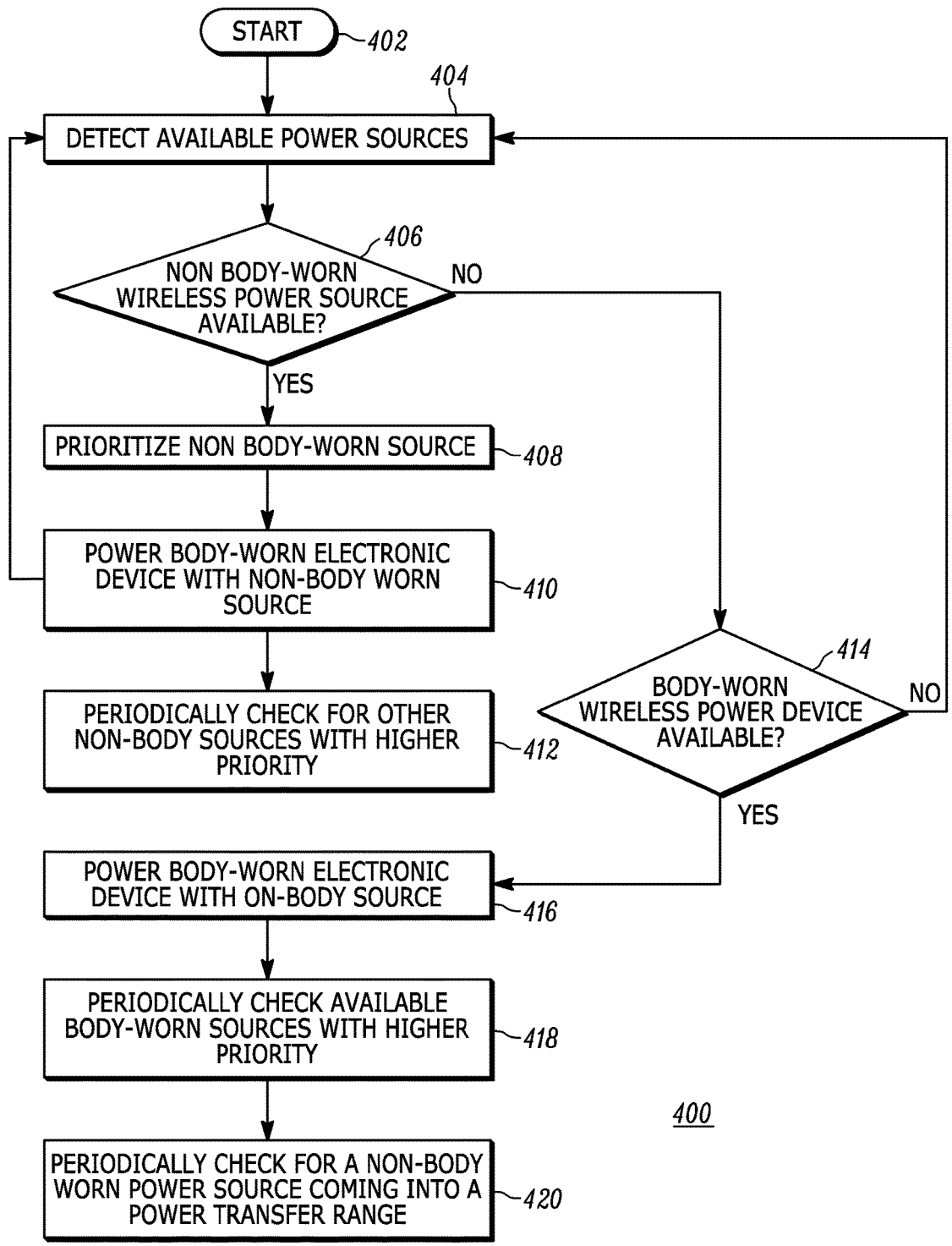
FIG. 4 is a method for powering/charging a body-worn wireless electronic device in accordance with some embodiments.

Referring to FIG. 4, a method 400 for powering a body-worn wireless electronic device is provided. Starting at 402 the method starts by detecting, by a body-worn wireless electronic device, available power sources at 404 to determine if a non body-worn wireless power source is available at 406, and if so, then prioritizing the non-body-worn wireless power source over the body-worn wireless power source at 408. At 410, in response to the prioritization, the body-worn wireless electronic device gets powered by the non body-worn wireless power source. Additionally, the method 400 may periodically check and switch over to higher priority non-body-worn wireless power sources, if available, at 412.

If, back at 406, there was no detection of a non body-worn wireless power source, but there was a detection of a body-worn wireless power source at 414 then the body-worn wireless electronic device will be powered by the body-worn wireless power source at 416. Additionally, the method 400 may periodically check and switch over to a higher priority body-worn wireless power source, if available, at 418. Additionally, the method 400 may periodically check and switch over to a non body-worn wireless power source that comes within a power transfer range of the body-worn wireless electronic device at 420.

Figure 5:
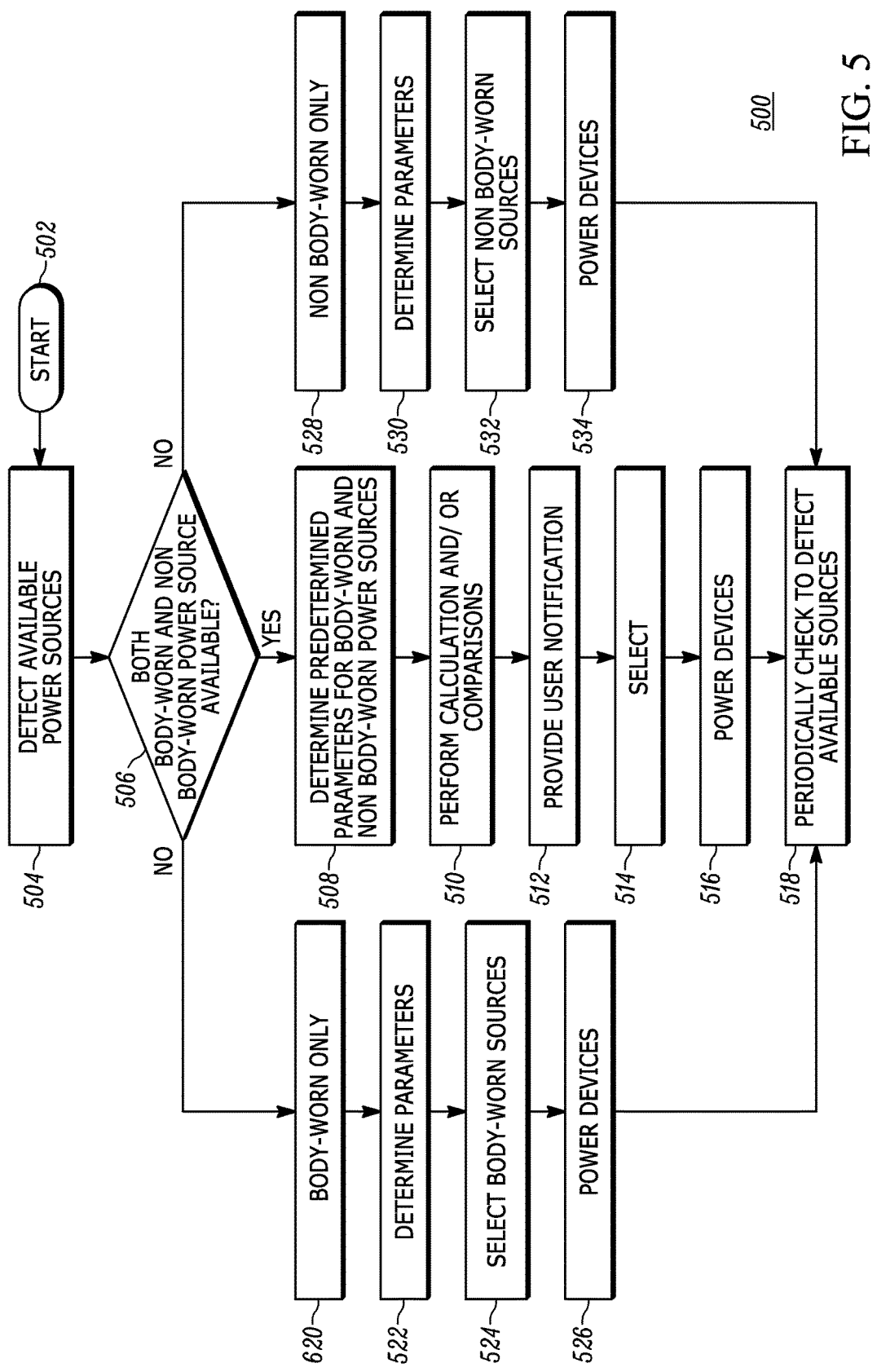
FIG. 5 is a method for powering a body-worn wireless electronic device is provided.

Referring to FIG. 5, a method 500 for powering a plurality of body-worn wireless electronic devices is provided. While the method 400 of FIG. 4 provided for the prioritization of a non body-worn wireless power source for powering a body-worn electronic device, method 500 takes an alternative approach where a plurality of both body-worn and non body-worn wireless power sources may be available for powering one or more body-worn electronic devices with increased optimization.

Method 500 begins at 502 with detecting available power sources at 504 and determining that a plurality of non body-worn wireless power sources and body-worn wireless power sources are available at 506. Predetermined parameters associated with each of the plurality of body-worn wireless power sources and non body-worn wireless power sources are determined at 508. Examples of the predetermined parameters determined at 508 may comprise, for a plurality non body-worn wireless power sources, one or more of: efficiency power transfer, power ratings, source coil size, and source location. Examples of the predetermined parameters of a plurality of the body-worn wireless power sources may comprise one or more of: power rating, coil size, position of the body-worn wireless power source relative to the body-worn wireless electronic device, and remaining power.

Calculations and/or comparisons may be made at 510 to determine which power source to power the body-worn electronic device. Depending on the electronic device being powered, different comparison thresholds may be set for one or more of the predetermined parameters to determine the optimal power source.

For a predetermined parameter of, for example, coil size, the coil size may be determined by a variety of means for each of the plurality of body-worn wireless power sources and each of the plurality of non body-worn wireless power sources. Such means can comprise of: device, device battery and/or source with a memory chip containing data for various devices and sources, devices and sources able to read the data. Device and/or source having a microcontroller that uses a pre-determined algorithm for decision making process in order to select the most optimal source. The data may alternatively be stored and/or decision making process made by a remote server that that the device can access. The device with the optimal coil size can then be selected for powering one of the electronic devices requiring power.

As another example, for a predetermined parameter of, power transfer efficiency, a calculation may be made, by the body-worn wireless electronic device, or a server, for power transfer efficiency for each of the plurality of body-worn wireless power sources and each of the plurality of non body-worn wireless power sources. Each body-worn wireless electronic device can then be powered based on calculated maximum power transfer efficiency. If selection conflicts arise, a variety of conflict resolution approaches can be used to facilitate selection. For example, a second level of selection criteria may be added using parameters such as remaining use time, device priority code, to name a few. Alternatively, the device can communicate to a potential conflict to the user and so that the user makes the decision as to which device to prioritize. Combinations of parameters and thresholds may be used depending on the device to be powered to determine the optimum power source.

A user notification may be provided at 512. This notification may alert the user to the optimum power source and may alternatively allow the user to override the power source with an alternative power source if desired. Each body-worn wireless electronic device dynamically selects a power source (body-worn or non body-worn) for optimal power transfer at 514. Thus, each of the body-worn wireless electronic devices are powered at 516 with an optimal power source from one of the plurality of body-worn wireless power sources or one of non body-worn wireless power sources based on at least one predetermined parameter. A periodic check is made at 518 to detect for changes in available sources. For example a user may add a power source or may enter a vehicle or may come within range of an AC power source.

Back at 506, the method 500 may determine that from the plurality of available power sources, only body-worn wireless power sources are available at 520. If this is the case, then predetermined parameters associated with each of the plurality of body-worn wireless power sources and are determined at 522. Again, these parameters may include but are not limited to power rating, coil size, position of the body-worn wireless power source relative to the body-worn wireless electronic device, and remaining power. The predetermined parameter is used as a basis for the body-worn electronic device to select, at 524, a body-worn wireless power source, for example by comparison of thresholds. A combination of predetermined parameters may also be checked. Also, because of the wireless nature of the powering, a single body-worn power source may charge more than one electronic device. Different parameters may also be checked for different types of body-worn electronic devices, so that an optimal body-worn wireless power source can be dynamically selected for each electronic device needing powering. A plurality of different electronic devices can thus be powered by matching to an appropriate power source. The body-worn wireless electronic device(s) is/are thus powered, at 526. Periodic checks for changes in power source availability can be made at 518.

Referring again back at 506, the method 500 may determine that only a non body-worn wireless power source is available at 528. The non body-worn wireless power source would likely be in the form of a vehicular wireless power source or an AC wireless power source. It is also feasible that more than one non body-worn power source may become available at one time, for example if a user comes within a power transfer range of two sources. If this is the case, then predetermined parameters associated with each of the plurality of non body-worn wireless power sources are determined at 530. These parameters may comprise but are not limited to efficiency of power transfer, power ratings, source coil size, and position of non body-worn wireless power source relative the body-worn wireless electronic device. The predetermined parameter is used as a basis for the body-worn electronic device to select, at 532, a non body-worn wireless power source, for example by comparison of thresholds. A combination of predetermined parameters may also be checked. Different parameters may also be checked for different types of body-worn electronic devices, so that an optimal non body-worn wireless power source can be dynamically selected for each electronic device needing powering. One or more body-worn wireless electronic device(s) can thus be powered, at 534, by one or more non body-worn wireless power sources. Periodic checks for changes in power source availability can be made at 518.

The method 500 is further envisioned as providing for varying the position of the power sources relative to the body-worn electronic device to maximize power transfer efficiency. The user has flexibility to move the power sources around and place devices which are used most often in strategic locations. Some devices may or may not require a large power source, so the ability to customize placement of a plurality of body-worn wireless power sources is highly useful. This aspect is further exemplified in FIG. 6.

Figure 6:
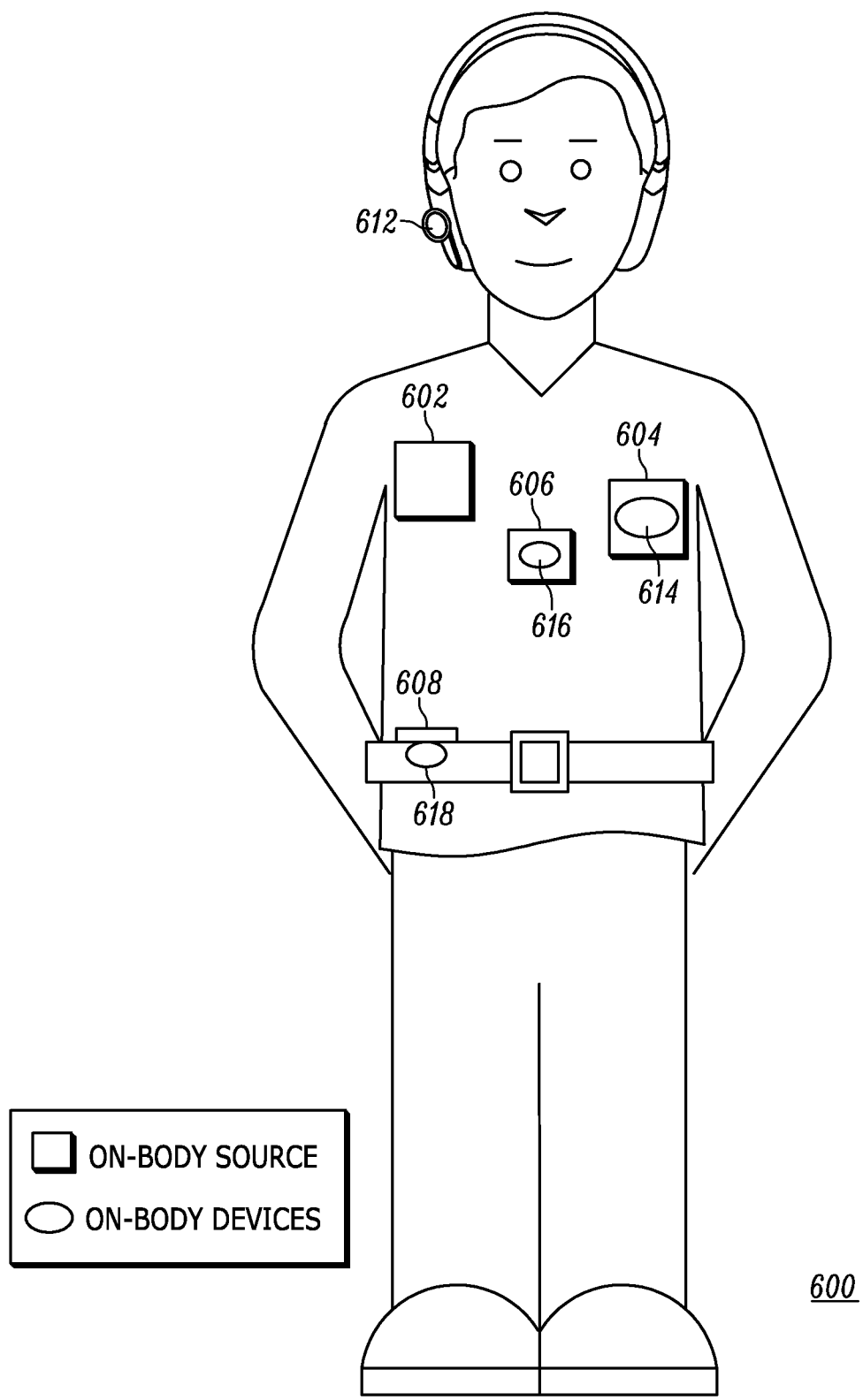
FIG. 6 is a diagram of a wireless power system in accordance with some embodiments.

FIG. 6 is a diagram of a wireless power system 600, in accordance with some embodiments. A plurality of body-worn wireless power sources 602, 604, 606, 608 are attached to an article of clothing 620 in a manner previously described. A plurality of body-worn wireless electronic devices 612, 614, 616, 618 are similarly attached to the article of clothing or on the user's body. The user receives an indication from each electronic device as to which power source is optimum for each device based on at least one predetermined parameter. The user can adjust the placement of each of the body-worn wireless power sources 602, to further enhance the power sourcing. For example body-worn wireless power source 602 can be moved further up the shoulder to communicate via a wireless link for the transfer of power to headset 612. Alternatively, if an indicator at electronic device 612 shows that body-worn wireless power source 608 is a better match for power sourcing and device 612 dynamically selects that source 608, then the user may further move the sources around, for example swapping the locations of body-worn wireless power source 602 with body-worn wireless power source 608.

In operation, each body-worn wireless electronic device detects available power sources. When only body-worn wireless power sources are available, then the plurality of body-worn wireless electronic devices will detect the plurality of body-worn wireless power sources and determine the predetermined parameters associated with each source. Examples of the predetermined parameters of the plurality of the body-worn wireless power sources may comprise one or more of: power rating, coil size, position of the body-worn wireless power source relative to the body-worn wireless electronic device, and remaining power. Each body-worn wireless electronic device is powered based on at least one of the predetermined parameters. The dynamic selection allows of power sources allows for optimal assignments to be made and conflicts to be resolved as the body-worn wireless power sources 602, 604, 606, 608 are also able to communicate with each other.

The user can be notified at as to which body-worn wireless power source 602, 604, 606, 608 gets assigned to which body-worn wireless electronic device 612, 614, 616, 618 such as by a visual display or audible tone indicator at each of the body-worn wireless electronic devices 612, 614, 616, 618 being powered.

The user may further reposition body-worn wireless power sources 602, 604, 606, 608 and body-worn wireless electronic devices 612, 614, 616, 618 if desired, and receive immediate feedback in the form of a visual alert or audible feedback as to the impact the repositioning had on powering the of the electronic device. Hence, a truly customizable system can be obtained while still managing power sourcing.

Additionally, if a non body-worn wireless power source were to become available within wireless power system 600, for example if the user were to enter a vehicle providing a non body-worn wireless power source 210 as previously described in FIG. 2, then the body-worn wireless electronic devices 610, 614 616 may prioritize the non body-worn wireless power source 210 of the vehicle to power the plurality of body-worn wireless electronic devices 610, 614 616, as was described by method 400 of FIG. 4. Additionally, the body-worn wireless power sources 602, 604, 606, 608 can also be charged by the non body-worn wireless power source, thereby ensuring their readiness for usage when the user moves away from the vehicle.

Alternatively, if both body-worn and non body-worn wireless power sources become available within wireless power system 600 for powering one or more body-worn wireless electronic devices 610, 614 616, then the method 500 can also be used where parameters from both body-worn and non body-worn wireless power sources are considered, and calculations, such as power efficiency can be made to select an optimum power source.

Accordingly, a wireless power system and method of managing power transfer has been provided. The ability to wirelessly power body-worn electronic devices through the dynamic selection and prioritization of body-worn power sources and non-body-worn power sources efficiently manages the powering of the body-worn electronic devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In particular executable code generated from software instructions for a wireless charger, a portable device, or both, which when executed cause the wireless charger or portable device to function in accordance with the disclosure, can be embodied on such computer-readable storage media. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A wireless power system, comprising:
    a plurality of wireless power sources; and
    a body-worn wireless electronic device for detecting the plurality of wireless power sources and selecting a wireless power source based on predetermined wireless power source parameters.

2. The wireless power system of claim 1, wherein the plurality of wireless power sources comprise a plurality of body-worn wireless power sources.

3. The wireless power system of claim 2, wherein the predetermined wireless power source parameters for the plurality of body-worn wireless power sources comprises one or more of: power rating, coil size, remaining power, and position of each body-worn wireless power source relative to the body-worn wireless electronic device.

4. The wireless power system of claim 2, wherein each of the plurality of body-worn wireless power sources each comprise: a wireless power receiver, a rechargeable energy source, a wireless power transmitter, and a communication module.

5. The wireless power system of claim 2, wherein the plurality of body-worn wireless power sources comprises one or more of: a portable two-way radio, a cell phone, or a camera.

6. The wireless power system of claim 2, wherein the plurality of wireless power sources further comprises:
    a non body-worn wireless power source.

7. The wireless power system of claim 6, wherein the non body-worn wireless power source is prioritized over the plurality of body-worn wireless power sources for powering the body-worn wireless electronic device.

8. The wireless power system of claim 6, wherein the non body-worn wireless power source is powered via a vehicular power source or an AC power source.

9. The wireless power system of claim 6, wherein the predetermined wireless power source parameters for the non body-worn wireless power source comprises one or more of: efficiency of power transfer, power ratings, source coil size, position of non body-worn wireless power source relative the body-worn wireless electronic device.

10. A wireless power system, comprising:
    a body-worn wireless electronic device;
    at least one body-worn wireless power source;
    at least one non body-worn wireless power source; and
    the body-worn wireless electronic device selecting a wireless power source based on predetermined parameters of the at least one body-worn wireless power source and the at least one non body-worn wireless power source.

11. The wireless power system of claim 10, wherein the at least one body-worn wireless power source comprises: a wireless power receiver, a rechargeable energy source, a wireless power transmitter, and a communication module.

12. The wireless power system of claim 10, wherein the at least one body-worn wireless power source comprises a power source of a portable two-way radio.

13. The wireless power system of claim 10, wherein the at least one non body-worn wireless power source is powered via a vehicular power source or an AC power source.

14. The wireless power system of claim 10, wherein the at least one body-worn wireless power source and the at least one non body-worn wireless power source communicate with the body-worn wireless electronic device via a wireless communication link.

15. The wireless power system of claim 10, wherein:
the at least one body-worn wireless power source comprises:
a plurality of body-worn wireless power sources removably coupled to an article of clothing; and
the body-worn wireless electronic device comprises one of: a remote speaker microphone, a sensor, a video camera, a wireless two-way radio, a remote push-to-talk (PTT) device, earpiece, smart glasses.

16. A method of for powering a body-worn wireless electronic device, comprising:
detecting, by a body-worn wireless electronic device, available power sources;
prioritizing a non body-worn wireless power source over a body-worn wireless power source; and
powering the body-worn wireless electronic device with the non body-worn wireless power source in response to the non body-worn wireless power source being detected and prioritized.

17. The method of claim 16, further comprising:
powering the body-worn wireless electronic device with a body-worn wireless power source in response to detecting only a body-worn wireless power source.

18. The method of claim 17, further comprising:
periodically checking, by the body-worn wireless electronic device, for availability of a non body-worn wireless power source; and
switching, from the body-worn wireless power source, to the non body-worn wireless power source in response to the non body-worn wireless power source coming within a power transfer range of the body-worn wireless electronic device.

19. The method of claim 16, wherein detecting, by a body-worn wireless electronic device, available power sources comprises:
detecting, by the body-worn wireless electronic device, a plurality of body-worn wireless power sources;
determining predetermined parameters associated with each of the plurality of body-worn wireless power sources; and
powering the body-worn wireless electronic device with one of the plurality of body-worn wireless power sources based on at least one of the predetermined parameters.

20. The method of claim 19, wherein the predetermined parameters comprise: power rating, coil size, remaining power, and position of each of the plurality of body-worn wireless power sources relative to the body-worn wireless electronic device.

21. A method of powering a plurality of body-worn wireless electronic devices, comprising:
detecting, by the plurality of body-worn wireless electronic devices, a plurality of body-worn wireless power sources;
determining predetermined parameters associated with each of the plurality of body-worn wireless power sources; and
dynamically selecting a body-worn wireless power source from the plurality of body-worn wireless power sources for each of the plurality of body-worn wireless electronic devices, based on at least one of the predetermined parameters; and
powering each of the plurality of body-worn wireless electronic devices with a dynamically selected body-worn wireless power source.

22. The method of claim 21, wherein dynamically selecting further comprises:
wirelessly communicating amongst the plurality of body-worn wireless electronic devices and the plurality of body-worn wireless power sources to determine optimum body-worn wireless power sources based on at least one of the predetermined parameters; and
resolving conflicts as part of the wireless communication.

23. The method of claim 21, further comprising:
repositioning one or more of the plurality of body-worn wireless power sources and plurality of body-worn wireless electronic devices; and
receiving a visual alert or audible feedback as to impact the repositioning has on powering.

24. The method of claim 21, further comprising:
detecting, by the plurality of body-worn wireless electronic devices, a non body-worn wireless power source; and
prioritizing the non body-worn wireless power source; and
switching to the non body-worn wireless power source for powering the plurality of body-worn wireless electronic devices.

25. The method of claim 24, further comprising:
powering and/or charging the plurality of body-worn wireless electronic devices with the prioritized non body-worn wireless power source.

26. A method of powering a plurality of body-worn wireless electronic devices, comprising:
detecting, by the plurality of body-worn wireless electronic devices, a plurality of wireless power sources comprising:
a plurality of body-worn wireless power sources; and
a plurality of non body-worn wireless power sources;
determining predetermined parameters associated with each of the plurality of wireless power sources;
dynamically selecting a wireless power source from the plurality of wireless power sources, based on at least one of the predetermined parameters, for each of the plurality of body-worn wireless electronic devices; and
powering each of the plurality of body-worn wireless electronic devices with a dynamically selected wireless power source.

27. The method of claim 26, wherein the predetermined parameters for the plurality of wireless power sources comprise: for the plurality of body-worn wireless power sources, at least one of:
power rating, coil size, remaining power, and position of the plurality of body-worn wireless power sources relative to each of the plurality of body-worn wireless electronic devices; and
for the plurality of non body-worn wireless power sources, at least one of: efficiency power transfer, power ratings, source coils size, source location.

28. The method of claim 26, wherein determining predetermined parameters associated with each of the plurality of wireless power sources further comprises:
calculating, by the plurality of body-worn wireless electronic devices, a power transfer efficiency for each of the plurality of wireless power sources; and
powering the plurality of body-worn wireless electronic devices based on maximum power transfer efficiency for each device.

29. The method of claim 26, further comprising:
providing a user notification of a dynamically selected wireless power source; and
allowing a user-override of the dynamically selected wireless power source.

30. The method of claim 26, further comprising:
positioning the plurality of wireless power sources relative and the plurality of body-worn wireless electronic devices to customize power transfer.

* * * * *